(12) United States Patent
Bertelloni

(10) Patent No.: US 7,267,401 B2
(45) Date of Patent: Sep. 11, 2007

(54) SEAT FOR A TWO-WHEELED VEHICLE

(76) Inventor: Pietro Bertelloni, Via Venezia, 24, 54037 Massa (IT)

( * ) Notice: Subject to any disclaimer, the term of this patent is extended or adjusted under 35 U.S.C. 154(b) by 0 days.

(21) Appl. No.: 10/521,996

(22) PCT Filed: Jul. 16, 2003

(86) PCT No.: PCT/IT03/00440

§ 371 (c)(1),
(2), (4) Date: Jan. 14, 2005

(87) PCT Pub. No.: WO2004/007268

PCT Pub. Date: Jan. 22, 2004

(65) Prior Publication Data

US 2005/0253427 A1    Nov. 17, 2005

(30) Foreign Application Priority Data

Jul. 16, 2002    (IT) ............................ PI2002A0039

(51) Int. Cl.
*B60N 2/38* (2006.01)

(52) U.S. Cl. .............. 297/195.1; 297/201; 297/215.15; 297/215.13

(58) Field of Classification Search ............. 297/195.1, 297/201, 204, 215.15, 215.13, 215.14
See application file for complete search history.

(56) References Cited

U.S. PATENT DOCUMENTS

| 357,059 | A | * | 2/1887 | Banks ......................... 297/314 |
| 468,398 | A | * | 2/1892 | Sherman ...................... 297/213 |
| 2,519,163 | A | * | 8/1950 | Turner .................... 248/292.12 |
| 4,541,668 | A | * | 9/1985 | Rouw .......................... 297/201 |
| 5,048,891 | A | | 9/1991 | Yach |
| 5,911,473 | A | * | 6/1999 | Hill .......................... 297/195.1 |
| 5,921,624 | A | * | 7/1999 | Wu ......................... 297/215.14 |
| 5,988,740 | A | * | 11/1999 | Caraballo .................... 297/201 |
| 6,056,356 | A | * | 5/2000 | Unger, Jr. .................... 297/201 |
| 6,079,774 | A | * | 6/2000 | Proust ...................... 297/195.1 |
| 6,213,553 | B1 | * | 4/2001 | Fitz ............................. 297/314 |
| 7,004,540 | B2 | * | 2/2006 | Catling ........................ 297/201 |

FOREIGN PATENT DOCUMENTS

| AT | 41 144 | 2/1910 |
| DE | 41 39 284 | 6/1993 |
| EP | 0 091 016 | 10/1983 |
| FR | 2 478 009 | 9/1981 |
| GB | 516832 | 1/1940 |

* cited by examiner

*Primary Examiner*—Laurie K. Cranmer
(74) *Attorney, Agent, or Firm*—Hedman & Costigan PC; James V. Costigan

(57) ABSTRACT

A seat for a two-wheeled vehicle comprising a relatively soft saddle support for a rider where the saddle support has a longitudinal direction axis and a cross direction axis as well as a supporting structure connecting the saddle support to a seat-carrying upright of the vehicle. A longitudinal oscillatable pin is provided between the upright and the supporting structure, where the oscillatable pin has a longitudinally extends substantially along a full extension of the longitudinal axis of the saddle support to allow the saddle support to oscillate about said longitudinal axis of said saddle support. A means is provided for preventing the oscillatable pin from oscillating and thereby preventing the oscillation of the saddle support.

14 Claims, 5 Drawing Sheets

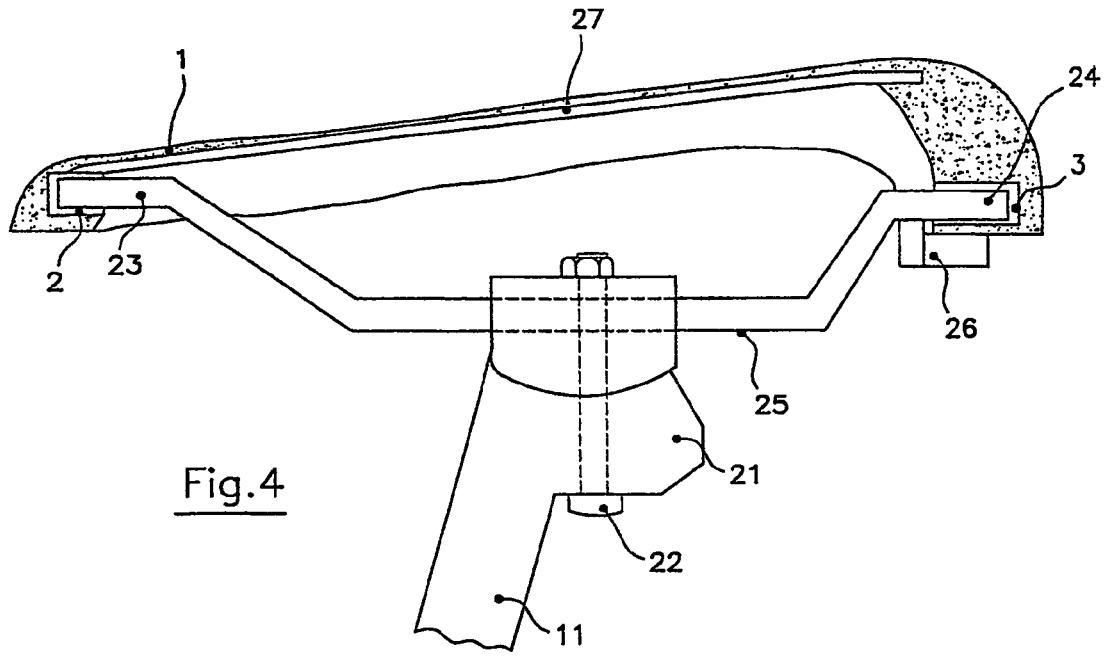
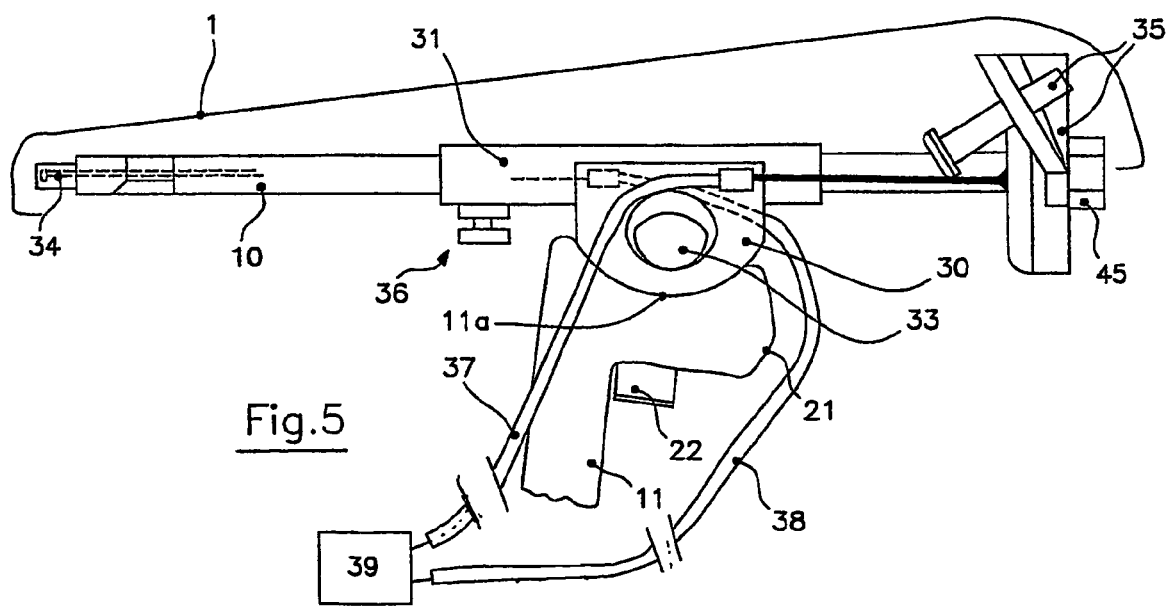

SEAT FOR A TWO-WHEELED VEHICLE

FIELD OF THE INVENTION

The present invention relates to a seat for two-wheeled vehicles, bicycles, motorcycles and scooters for example, capable of oscillating around its longitudinal axis.

BACKGROUND OF THE INVENTION

It is well known that when a cyclist pushes on the pedal, the upper internal part of his thigh rubs against the parts of the seat with which it is in contact and that this causes rubefaction and discomfort. Furthermore, the seat's rigid response to the movements carried out during the pedaling contributes in a not negligible manner to the feeling of discomfort typically associated with remaining for a long time on the seat of a bicycle and, after all, to the strain felt by the cyclist.

The document EP 0091016 discloses a part for a bicycle according to the preamble of claim 1.

OBJECT AND SUMMARY OF THE INVENTION

The general purpose of the present invention is to provide a seat for two-wheeled vehicles that will make it possible to avoid the drawbacks that have just been outlined.

A particular aim of the present invention is to provide a seat of the aforementioned type that will be capable of oscillating about its longitudinal axis and such that said oscillation can be locked.

Another aim of the present invention is to provide a seat of the aforementioned type in which the amplitude of the oscillation about its longitudinal axis can be adjusted.

A further aim of the present invention is to provide a seat of the aforementioned type in which the oscillation is associated with the possibility of the seat sliding in the longitudinal direction in such a way as to permit the seat configuration to be adapted in an optimal manner to the road on which the cyclist is moving.

These aims are attained by the seat in accordance with the invention of which the essential features are specified in claim 1. Further important characteristics are set out in the dependent claims.

The salient feature of the seat for two-wheeled vehicles in accordance with the present invention consists in that it is mounted on a pin capable of oscillating around its longitudinal axis and that there are provided means capable of both locking the oscillations and regulating their amplitude.

BRIEF DESCRIPTION OF THE DRAWINGS

Other features and advantages of the seat for two-wheeled vehicles in accordance with the present invention will be brought out more clearly by the following description of some embodiments thereof, which is given by way of example and is not to be considered limitative in any way, the description making reference to the attached drawings, of which:

FIG. 4 is a schematic longitudinal section through a variation of the seat of FIGS. 1-3;

FIG. 5 is a schematic longitudinal view of a second embodiment of the seat in accordance with the invention;

DETAILED DESCRIPTION OF THE INVENTION

Figure 1:
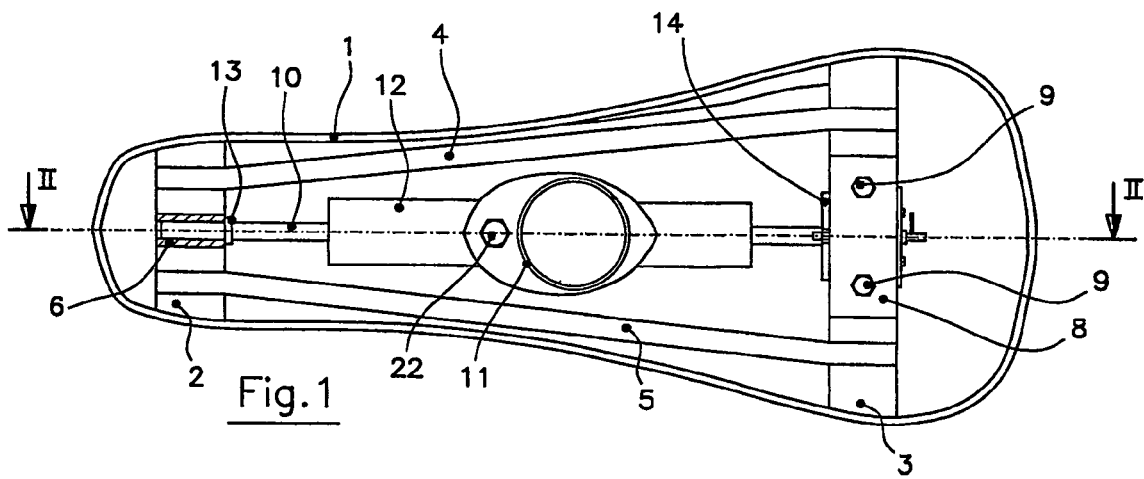
FIG. 1 is a bottom plan view of the two-wheeled vehicle seat in accordance with the invention.
Figure 2:
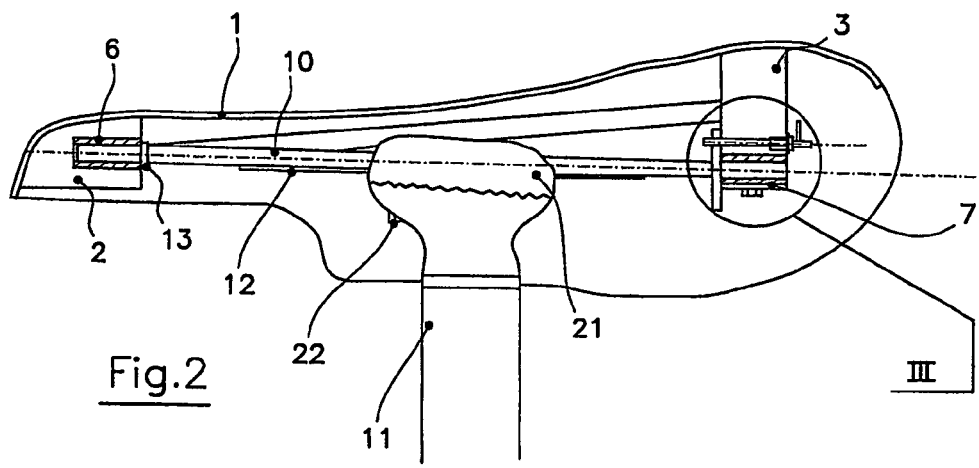
FIG. 2 is a longitudinal section through the seat along lines II-II of FIG. 1.
Figure 3:
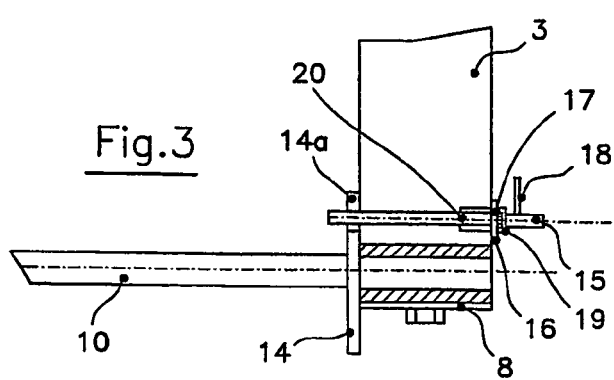
FIG. 3 is an enlarged view of the detail surrounded by a circle in FIG. 2.

Referring to FIGS. 1-3, the reference number 1 has been used to indicate a support that bears the rider and constitutes the upper part of the bicycle seat, or saddle pad, made of a yielding and soft material (leather, plastic or similar) and is provided with a lower part constituting the supporting structure made up of the crosspieces 2 and 3, indicated respectively as the forward and the rearward crosspiece, which are made of rigid material and are connected to each other by the round bars 4 and 5.

In the forward crosspiece 2 there is housed a first bushing or bearing 6, while a second bushing or bearing 7 is applied to the rearward crosspiece 3 by means of a strip 8 fixed to the crosspiece 3 by means of screws 9. The two ends of a pin 10 that extends longitudinally and is rigidly connected to the upright 11 carrying the saddle are rotatably housed in the two supports 5 and 7.

Pin 10 is provided with a stiffening plate 12 that facilitates the longitudinal sliding and enhances the flexural rigidity of the pin. Pin 10 also has a first shoulder 13 that acts as a stop for the first support 6 and, at the opposite end, a second shoulder 12 that acts as a stop for the second support 7. As can better be seen in FIG. 3, second shoulder 14 is of a substantially discoidal shape with a radial notch 14a. A ratchet 15 is attached to the crosspiece 13 by means of a strip 16 and screws 17 and can slide across it in a position corresponding to notch 14a of shoulder 14. Ratchet 15 is provided with a small lever 18 to permit its being easily gripped and made to slide across the crosspiece 3. When it is desired to lock the oscillation of the saddle 1, ratchet 15 has to be slid until it engages with notch 14a. When the ratchet is not engaged with notch 14a, the saddle can oscillate freely. Two end-of-run stops, indicated by 19 and 20, are provided on the ratchet and correspond, respectively, to the positions in which the ratchet is disengaged from notch 14a and engaged with it.

The position of saddle 1 with respect to upright 11 can be regulated by causing pin 10 to slide with respect to head 21 of upright 11 after having slackened locking screw 22.

Alternatively, the supports 6 and 7 can be provided with rubber articulations of a known type to perform the same function.

In the variation of FIG. 4, where components equal to those of the previous figures are always indicated by the same reference number, round bars 15 (one only can be seen in FIG. 4, the other or the others being hidden by it), which form part of the supporting structure of saddle 1 and are rigidly locked to the head of saddle-carrying upright 11 by means of the tightening of screw 22, converge onto two pins 23 and 24 that are rotatably engaged in small blocks 2 and 3 of saddle 1, where the blocks may or may not be provided with a rolling support. A device, generically indicated by 26, is also provided for locking seat 1 with respect to pins 23 and 24, and may be, for example, of the type illustrated in FIGS. 1-3 or some equivalent device.

In order to limit the torsion between the front and the rear part of saddle 1, one or more metal ribs, indicated by the reference number 27, made of metal or some other torsion-resisting material, may advantageously be inserted in it.

The supporting structure, indicated by 25 in FIG. 4, may also be made of just one appropriately sized round bar or other metallic rod of which the ends act as trunnions. The size of the trunnions is such that they can safely be inserted in seatings 2 and 3 without there being any risk of their slipping out and to this end they may also be provided with appropriate locking systems of a conventional type.

Another embodiment of the invention is illustrated by FIG. 5, where components identical to those of the previous embodiments are indicated by the same reference numbers. According to this embodiment, head 21 of saddle holding upright 11 has a concave end 11a in which there is arranged the complimentarily shaped base of a block 20 that has a tubular longitudinal guide 31 rigidly connected to it. The relative position of block 30 with respect to head 21 of upright 11 makes it possible to regulate the inclination of saddle 1. The locking of block 30 with respect to head 21 is obtained by tightening screw 22 that engages with a hollow plug 33 passing transversely through block 30. Pin 10 is rendered integral with saddle 1 by means of fixing devices generically indicated by 34 and 35 and is slidingly mounted inside tubular guide 31. The oscillation of saddle 1 is controlled by a mechanism 36 of the type, for example, illustrated in FIGS. 10-12. The sliding of saddle 1 with respect to head 21 of upright 11 is controlled by means of a pair of sheathed tension cables 37 and 38 acting in opposition to each other and remotely operated, for example by means of a small lever under the saddle generically indicated by 39.

Figure 6:
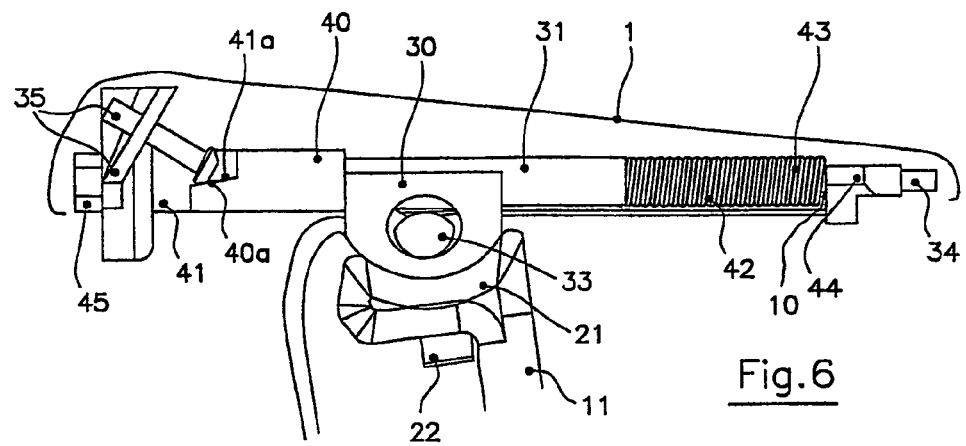
FIG. 6 is a schematic side elevation of a third embodiment of the seat in accordance with the invention.

Another embodiment of the invention is illustrated by FIG. 6, where components identical to those of the previous embodiments are again indicated by the same reference numbers. As in the embodiments of FIGS. 4 and 5, this embodiment comprises a tubular guide 31 integral with a block 30 that can be tightened on head 21 of upright 11 by means of screw 22 and plug 33. Longitudinal pin 10 is rendered integral with the saddle 1 by means of connections 34 and 35, so that saddle 1 may slide and oscillate integrally with it. Coaxially fixed to tubular guide 31, on one side with respect to block 30, there is a sleeve 40, one end of which has an axially inclined portion 40a obtained by removing a roughly semi-annular portion of its side wall.

A sleeve 42, coaxial with sleeve 40 and integral with pin 10, has an end 41a correspondingly inclined, obtained in the same manner, and counterposed to end 40a of sleeve 40 in such a manner that it can become coupled with it following the sliding of pin 10 controlled by a sheathed tension cable 42 connected to block 30 and capable of being operated by, for example, a small lever (not shown) situated beneath the saddle. The action of the tension cable is opposed by a spring 43 coaxial with pin 10 and arranged between the end of tubular guide 31 on the side of block 30 opposite to sleeve 40 and a stop 44 fixed to the end of pin 10. The end of the tension cable is also attached to stop 44.

Figure 7:
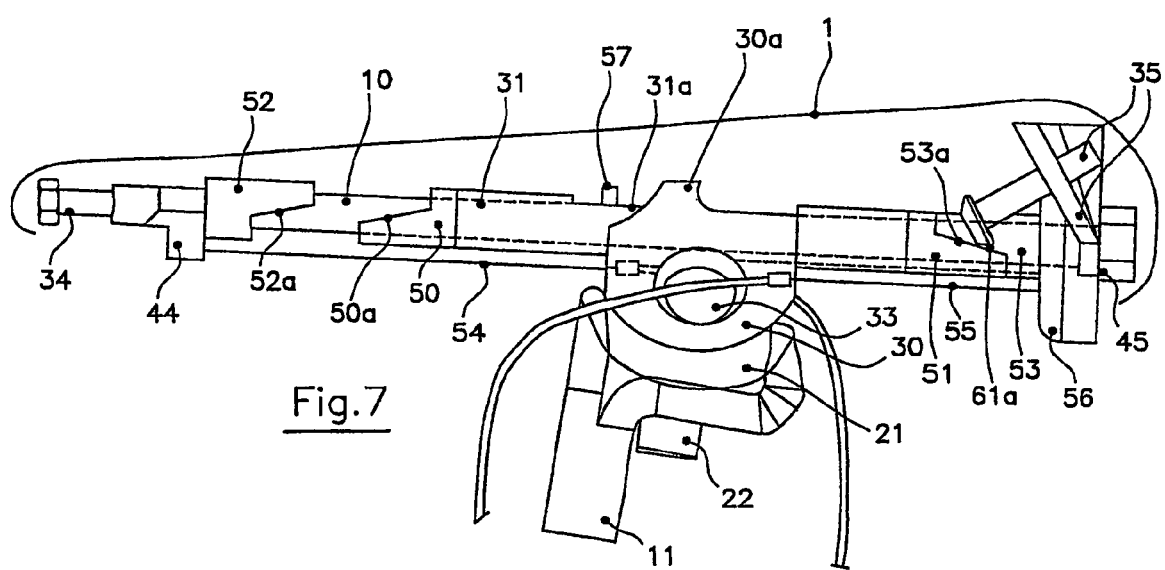
FIG. 7 is a schematic side elevation of a fourth embodiment of the seat in accordance with the invention.

When the two inclined ends 40a and 41a of, respectively, sleeves 40 and 41 have come to constitute a perfect fit as shown in FIG. 7, all further rotation of pin 10 within tubular guide 32 is prevented. On the other hand, as the two sleeves 40 and 41 move away from each other due to the effect of the traction applied by tension cable 42, the amplitude of the oscillation that pin 10 is allowed to perform will increase. Spring 43 acts in opposition to tension cable 42 and therefore tends to keep the two inclined surfaces 40a and 41 in the position in which the form a perfect fit.

It should be noted that in the illustrated embodiments the seating plane of the saddle is inclined forward with respect to pin 10, which is substantially horizontal, In practice, the rear of pin 10 will be lowered from 10 to 80 mm with respect to the seating plane of the seat 1.

It should also be noted that in the embodiment illustrated by FIGS. 5 and 6 there is provided a rearward nut 45 that can be screwed onto pin 10 and therefore makes it possible to tension soft support 1 of the seat.

FIG. 7 illustrates yet another embodiment of the oscillating seat in accordance with the invention that renders possible controlled oscillation and or lockage of the oscillation of the seat both in a rearward and a forward position thereof. This embodiment is particularly advantageous, above all, for sporting and competitive activities, because the advanced position of the seat is the one generally preferred for uphill routes, while the rearward position is preferred for downhill routes. The possibility of controlling the oscillation of the seat in both these positions therefore appreciably improves its performance.

Referring to FIG. 7, the saddle in accordance with this embodiment is still of the type in which there is provided a tubular guide 31 for an oscillation pin 10 integral with a block 30 mounted in an adjustable manner on head 21 of saddle-carrying upright 11 by the tightening of a bolt 22 that arrests a stem 33 passing transversely through block 30. Fixed to the two ends of tubular guide 31 there are two sleeves 50 and 51 coaxial with pin 10 and both provided with inclined ends 50a and 51a. Two further sleeves 52 and 53 integral with pin 10 and coaxial with it are provided with inclined ends 52a and 53a opposed to the respective inclined ends 50a and 51a of sleeves 50 and 51. Two sheathed portions 54 and 55 of a single tension cable are fixed with their respective ends to stop 44 integral with one end of pin 10 and to a further stop 56 integral with the other end of the same pin 10. The two portions 54 and 55 of the tension cable converge onto a common activation device (not shown), a lever situated under the seat for example, thanks to which it is possible at one and the same time to make pin 10 slide in tubular guide 31 and to regulate the amplitude of the oscillation, right to the point of locking it, in the two positions, i.e. respectively with the seat pushed forward or with the seat pushed backward.

In the configuration illustrated by FIG. 7 the seat is pushed completely forward and all rotation is prevented by the fact that the two inclined ends 51a and 53a constitute a perfect fit. Traction applied to the portion 54 of the tension cable will produce the gradual disengagement of the aforesaid inclined ends, but will bring the inclined ends 50a and 52a closer together and eventually make them constitute a perfect fit when the saddle reaches its rearward position, where the possibility of rotation is once again prevented. In all the intermediate positions, on the other hand, oscillation will be possible with an amplitude that gradually increases as the two inclined ends 51a and 53a move away from each other in the forward position, and then gradually decreases as the inclined ends 50a and 52a come closer to each other in the rearward position.

With a view to making it possible for the oscillation to be locked also in a position intermediate between the completely advanced position and the completely rearward position, there is provided a locking device consisting of a tooth 57 integral with pin 10 and projecting from a slot 31a situated in a central position on tubular guide 31. Locking of the rotation will be obtained when, due to the sliding of pin 10, tooth 57 comes to be situated within a corresponding vault defined by an arched portion 30a of block 30 bridging over tubular guide 31.

Figure 8:
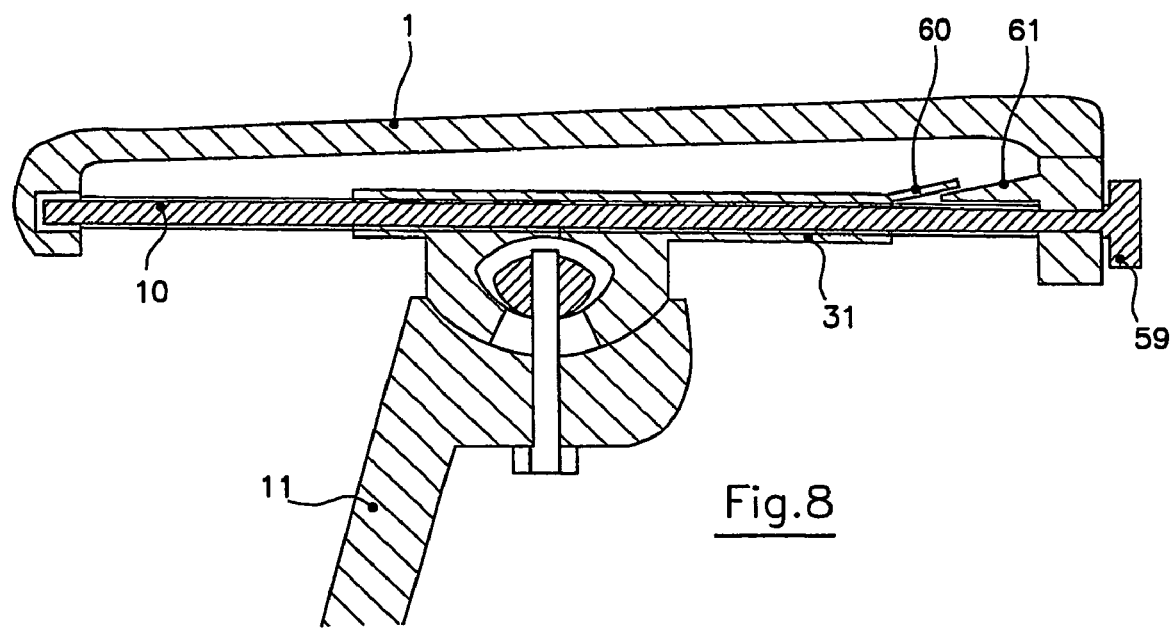
FIG. 8 is a simplified variation of the seat in accordance with the invention.

In a simplified variation of the invention, which is illustrated by FIG. 8, pin 10 is a threaded pin integral with saddle 1 and engaged within tubular guide 31 integral with saddle-carrying upright 11, the tubular guide being likewise threaded on its inside. At the rearward end of pin 10 there is provided a knob 59 by means of which pin can be rotated and therefore moved forward and backward. A mechanism for adjusting and blocking the oscillation of the previously mentioned type is also provided, so that rotation of the aforesaid knob also makes it possible to adjust the amplitude of the oscillation or eventually to lock it completely. In particular, said mechanism comprises an inclined plate 60 that extends between an end of tubular guide 31 and a similarly inclined check wall 61 integral with the saddle. As inclined plate 60 approaches check wall 61 due to the translation of pin 10, the oscillation amplitude of the pin will become gradually reduced and eventually completely locked when plate 60 fits perfectly against wall 61.

Given its constructional simplicity, the oscillation mechanism shown in FIG. 8 can also be employed for converting conventional saddle into oscillating saddle that can be adjusted in the longitudinal direction.

Figure 9:
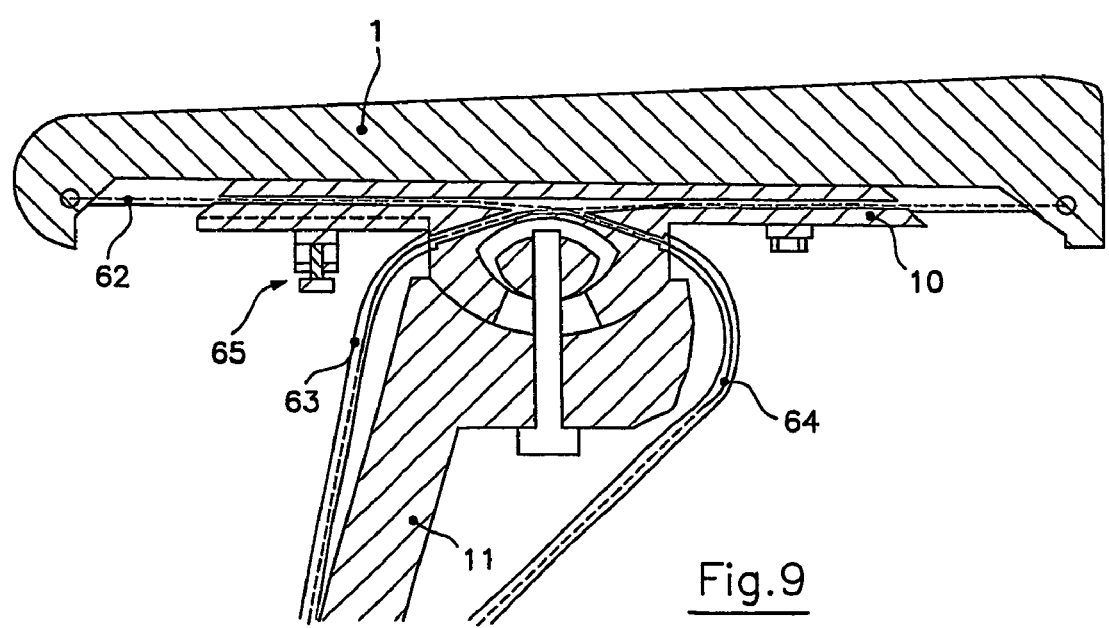
FIG. 9 is a fifth embodiment of the seat in accordance with the invention.

In the embodiment of the seat in accordance with the invention illustrated by FIG. 9 the supporting structure of the saddle comprises a longitudinal groove 62 in which pin 10 is arranged in such a manner as to be able to slide. Its sliding in one direction or the other is controlled by a pair of tension cables 63 and 64 that converge on an activation device, a lever for example, similar to the one provided for the embodiments illustrated by FIGS. 5 and 7. Pin 10 may also rotate within groove 62 and is provided with an oscillation control and lockage mechanism generically indicated by 65.

Figure 10:
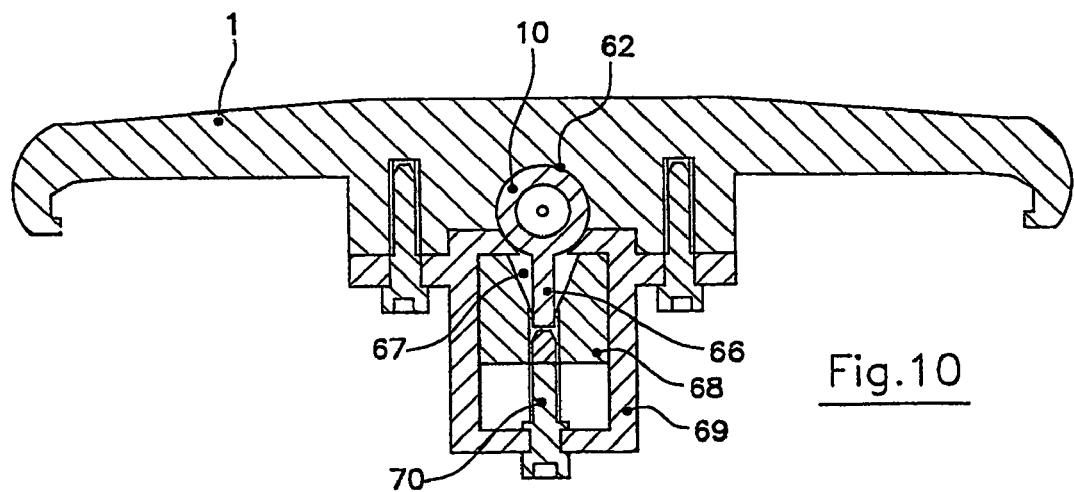
FIGS. 10, 11 and 12 illustrate other possible solutions for the mans of regulating the amplitude of the oscillation of the seat.
Figure 11:
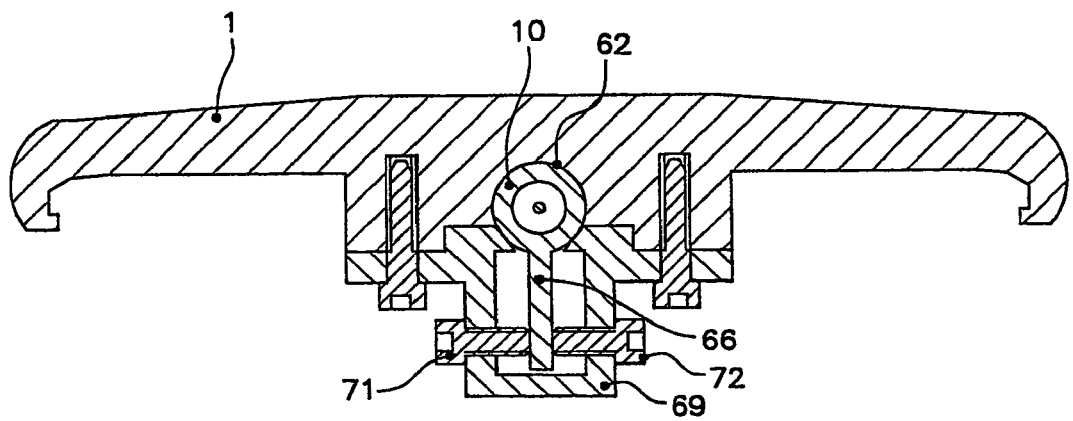
Figure 12:
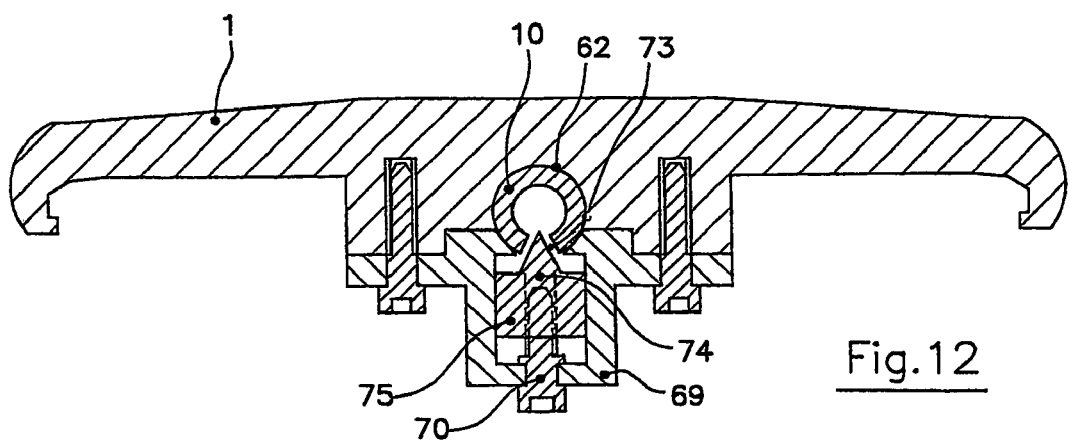

This mechanism may be of the type used in FIGS. 10, 11 and 12, According to the variation of FIG. 10, pin 10 has a radial rib 66 that engages with a flared groove 67, i.e. a groove of a substantially triangular section provided on a small block 68 that can slide in a seating 69 integral with the supporting structure of the saddle. The sliding of small block 68 is obtained by rotating a screw 70 fixed with respect to seating 69 and screwed into block 68. As the block comes gradually closer to rib 66, the amplitude with which pin 10 is allowed to oscillate will become reduced and eventually completely locked.

In the variation of FIG. 11, on the other hand, radial rib 66 extends between a pair of adjustment screws 71 and 72 axially facing to each other and screwed into the side walls of seating 69. In this case adjustment of the oscillation amplitude is obtained by tightening or slackening screws 71 and 72 to increase or decrease the space between them.

In the variation of FIG. 12 pin 10 is provided with a groove 73 that engages with prismatic tooth 74 having a triangular section and projecting from a small block 75 that can be made to slide within seating 69 by acting on screw 70. In this case the reduction of the oscillation amplitude of pin 10 and its eventual locking are obtained as the tooth 74 is gradually pushed further into groove 73 of pin 10.

Though the present description makes reference for the most part to seats for bicycles, the invention also extends to the seats of other two-wheeled vehicles. For example, the possibility of having an oscillating seat may be advantageous in competition motorcycles, because the oscillation of the seat will accompany the rider in the bends. The oscillatory motion makes it possible to use larger and more ergonomic seats.

The seat in accordance with the invention can be readily dismantled by simply unscrewing screw 22 and, in the versions in which it is provided, pulling plug 33 out of block 30, so that in this way a seat of any other shape can be mounted.

The invention claimed is:

1. A seat for a two-wheeled vehicle, in particular a bicycle, motorcycle and a scooter, comprising a relatively soft saddle support to bear a rider thereon, said saddle support having a longitudinal direction axis and a cross direction axis, a supporting structure connecting said saddle support to a seat-carrying upright of said vehicle, between said supporting structure and said upright there being provided a longitudinal oscillatable pin having an oscillating axis longitudinally extending substantially along a full extension of said longitudinal axis of said saddle support, thereby allowing said saddle support to oscillate about said longitudinal axis of said saddle support, oscillation preventing means for preventing an oscillation of said pin and accordingly of said saddle support being provided between said pin and said supporting structure, said seat further comprising means for adjusting an amplitude of said oscillation of said pin around said longitudinal axis thereof, said pin being connected to said upright and having two pin ends rotatably connected to said supporting structure, said pin being integral with said supporting structure and being connected to said upright in such a manner as to be able to slide and turn, wherein a tubular guide is moreover provided within which said pin is slidably and rotatively mounted and is integrally connected to said upright, means being provided for controlling a sliding of said pin within said tubular guide.

2. A seat in accordance with claim 1, wherein said means for controlling the sliding of said pin within said tubular guide comprise pulling means that extend between said upright and at least one end of said pin and are connected to a remote actuation device.

3. A seat in accordance with claim 2, wherein said pin has an outer thread and said tubular guide has an inner thread, manual actuating means being provided at one end of said pin to impart an angular displacement to said pin, to cause said pin to slide within said guide.

4. A seat in accordance with claim 2, wherein said oscillation preventing means comprise an element sliding on said supporting structure and a seating integral with said pin, said sliding element being positioned on said structure in such a way as to be aligned with said seating to become engaged within said seating to prevent said oscillation or to become disengaged therefrom to permit said oscillation.

5. A seat in accordance with claim 1, wherein said oscillation preventing means also allows to regulate the amplitude of the oscillation and comprise at least one sleeve integral with said tubular guide and coaxial with it and at least one sleeve integral with said pin and coaxial with it, said sleeves having opposed ends provided with complementary inclined surfaces that gradually become engaged with each other and reduce the oscillation possibility as the distance between them becomes smaller until they eventually come to constitute a locking fit that prevents one end of said sleeve from rotating with respect to the other end of said sleeve.

6. A seat in accordance with claim 5, wherein a first sleeve with an inclined end is coaxially fixed to one end of said tubular guide and a second sleeve with a complementary inclined end is counterposed to the first coaxially integral with one end of said pin, a pull wire being connected to the other end of said pin and elastic means being interposed between this latter end of said pin and an end of said tubular guide opposite to the one to which said first sleeve is attached.

7. A seat in accordance with claim 1, wherein said supporting structure has a part integral with said saddle support and a part integral with said upright, the part integral with said upright being provided with longitudinal linkage elements rigidly connected to said upright and converging onto two coaxially opposed pins (23, 24) that are rotatably connected to the part of the supporting structure rigidly connected to said saddle support.

8. A seat in accordance with claim 1, wherein said oscillation preventing means also allows to regulate the amplitude of the oscillation and comprise two sleeves with inclined ends coaxially fixed to the two ends of said tubular guide, two corresponding sleeves with complementary inclined ends being coaxially fixed to the ends of said pin, there being provided a remote manually actuated tension cable which has its ends connected to the ends of said pin, said tension cable being slidingly supported by said upright, so that pulling said tension cable in one direction or the other will cause said pin to slide relatively forward or backward until it reaches two limit positions of complete forward displacement or complete rearward displacement of the seat in which the respective pairs of the inclined ends of said sleeves prevent said pin from further rotating, whereas in an intermediate position relative rotation of said pin is possible with an increasing amplitude that depends on a distance between said inclined ends of said sleeves.

9. A seat in accordance with claim 1, wherein from said pin there extends a tooth that projects within a longitudinal slot provided on said tubular guide capable of becoming engaged with a vault delimited by an arcuate portion bridging said tubular guide to prevent rotation of said pin in an intermediate position between an extreme forward position of the seat and an extreme rearward position thereof.

10. A seat in accordance with claim 1, wherein said pin is slidingly and rotatably engaged in a longitudinal groove integral with said supporting structure, there being provided, integral with said structure, pulling means for controlling sliding movements of said pin in both directions and means for locking the oscillation.

11. A seat in accordance with claim 10, wherein said oscillation preventing means comprise a radial rib arranged between two walls situated at a gradually variable distance from each other.

12. A seat in accordance with claim 11, wherein said walls comprise a flared groove of a substantially triangular section provided in a small block that can slide with respect to said pin, said rib being engaged in said groove.

13. A seat in accordance with claim 11, wherein said walls comprise end portions of two setting screws axially facing to each other and screwed into walls integral with said structure.

14. A seat in accordance with claim 10, wherein said oscillation control means comprise a longitudinal groove provided on said pin and a prismatic tooth of a substantially triangular section that can gradually become engaged within said groove.

* * * * *